(12) United States Patent
Tong et al.

(10) Patent No.: US 9,971,104 B2
(45) Date of Patent: May 15, 2018

(54) FIBER OPTIC CONNECTOR HAVING RADIO FREQUENCY IDENTIFICATION TAG

(71) Applicant: Tyco Electronics (Shanghai) Co. Ltd., Shanghai (CN)

(72) Inventors: Zhaoyang Tong, Shanghai (CN); Lei Liu, Shanghai (CN); Lin Lin, Shanghai (CN)

(73) Assignee: ADC Telecommunications (Shanghai) Distribution Co., Ltd., Shanghai (CN)

( * ) Notice: Subject to any disclaimer, the term of this patent is extended or adjusted under 35 U.S.C. 154(b) by 0 days. days.

(21) Appl. No.: 14/910,561

(22) PCT Filed: Jul. 17, 2014

(86) PCT No.: PCT/IB2014/063174
§ 371 (c)(1),
(2) Date: Feb. 5, 2016

(87) PCT Pub. No.: WO2015/019216
PCT Pub. Date: Feb. 12, 2015

(65) Prior Publication Data
US 2016/0178858 A1 Jun. 23, 2016

(30) Foreign Application Priority Data

Aug. 5, 2013 (CN) .................... 2013 2 0474205 U (51) Int. Cl.
G02B 6/38 (2006.01)
H04Q 1/02 (2006.01)
G06K 7/10 (2006.01)

(52) U.S. Cl.
CPC .......... *G02B 6/3895* (2013.01); *G02B 6/387* (2013.01); *G02B 6/3821* (2013.01); *H04Q 1/138* (2013.01);
(Continued)

(58) Field of Classification Search
None
See application file for complete search history.

(56) References Cited

U.S. PATENT DOCUMENTS

2007/0013487 A1 1/2007 Scholtz et al.
2009/0032577 A1* 2/2009 Aguren ................ G02B 6/3895
235/375
(Continued)

OTHER PUBLICATIONS

International Search Report for International Application No. PCT/IB2014/063174 dated Nov. 14, 2014 (2 pages).

*Primary Examiner* — Jerry Rahll
(74) *Attorney, Agent, or Firm* — Merchant & Gould P.C.

(57) ABSTRACT

A fiber optic connector having a radio frequency identification tag for optically coupling with a mated fiber optic connector, comprising: a housing; a fiber ferrule extending from a first end of the housing; a spring member provided within the housing; a tail sleeve connected at a second end of the housing opposite to the first end to fix an end of an optical cable; and a tag receiving portion formed in a sidewall of the housing, wherein the radio frequency identification tag is received in the tag receiving portion, and wherein the tag receiving portion is separated from the spring member and the tail sleeve in a longitudinal direction of the housing. The RFID tag overlaps with only the non-metal housing and the non-metal protection sleeve in the lateral direction. As a result, it can eliminate the effect of metal materials in the fiber optic connector on the reading performance of the radio frequency identification tag.

16 Claims, 3 Drawing Sheets (52) U.S. Cl.
CPC .......... *G02B 6/3849* (2013.01); *G02B 6/3887* (2013.01); *G06K 7/10366* (2013.01)

(56) References Cited

U.S. PATENT DOCUMENTS

| | | | |
|---|---|---|---|
| 2010/0079248 A1* | 4/2010 | Greveling | G02B 6/3879 340/10.1 |
| 2010/0098425 A1* | 4/2010 | Kewitsch | G02B 6/3895 398/116 |
| 2011/0274437 A1 | 11/2011 | Jones et al. | |
| 2012/0007717 A1* | 1/2012 | Jong | G02B 6/3895 340/10.4 |
| 2013/0076589 A1* | 3/2013 | Caveney | H04Q 1/138 343/906 |
| 2014/0141649 A1* | 5/2014 | Standish | G06K 7/10415 439/620.01 |
| 2015/0226925 A1* | 8/2015 | Lambourn | G02B 6/3895 385/75 |

* cited by examiner

FIBER OPTIC CONNECTOR HAVING RADIO FREQUENCY IDENTIFICATION TAG

CROSS-REFERENCE TO RELATED APPLICATION

This application is a National Stage of PCT/IB2014/063174, filed 17 Jul. 2014, which claims benefit of Chinese Patent Application No. 201320474205.4 filed on Aug. 5, 2013 in the State Intellectual Property Office of China and which applications are incorporated herein by reference. To the extent appropriate, a claim of priority is made to each of the above disclosed applications.

BACKGROUND OF THE INVENTION

Field of the Invention

The present invention relates to a fiber optic connector, more particularly, relates to a fiber optic connector having a RFID (Radio Frequency Identification) tag.

Description of the Related Art

In a fiber optic communication system, a fiber optic connector is used to perform coupling, distributing or switching among different fibers or pigtail fibers, and each of the fibers or pigtail fibers is coupled to the respective fiber optic connector.

In the prior art, during connecting optical fibers in an optical fiber distribution system, the optical fibers are identified depended on serial numbers on tags adhered to the optical fibers or serial numbers printed on the optical fibers. Also, ports of the fiber optic connector to be connected with the optical fibers are identified depended on serial numbers on tags adhered to the ports or serial numbers printed on the ports. In some conditions, there may be no serial number on the ports, and the ports are identified depended on only the order of arranging them.

Accordingly, in practice, for finishing a connection operation of optical fibers, an operator has to perform the following steps of: firstly, looking up a fiber-port distribution table associated with the fiber optic connector; secondly, visually identifying serial numbers of optical fibers; and finally, looking for the ports of the fiber optic connector corresponding to the optical fibers based on the table and correctly inserting the optical fibers into the respective ports. During each of the above steps, it needs the operator to carefully identifying the serial numbers of the optical fiber and/or the fiber optic connector, causing the vision tiredness of the operator. In a situation, the serial numbers may become blurred or damaged due to the severe application condition and may be illegible for the operator. Also, lighting in the operation field may disadvantageously affect the operator to identify and determine the serial numbers. Furthermore, it is difficult for the operator to find a misconnection of the optical fibers in the field, and the operator cannot find the misconnection in time. Also, the operator encounters the above difficulties again during performing the maintenance for the optical fibers.

An identification device adopting RFID technology, as a wireless communication technology, can identify specific targets and read and write data correlated to the specific targets with wireless communication signals. As a result, it is not necessary to build up a physical electrical or optical connection between the identification device and the specific targets. The RFID contains data electronically stored therein, and the reliable identification distance for the RFID may be up to several meters. The RFID tag is different from a bar code tag because the RFID can be not only provided on a surface of the target to be identified/tracked, but also embedded inside the target to be identified/tracked.

In a fiber distribution management system of the prior art based on the RFID technology, each of fiber optic connectors is mounted with a RFID tag having a unique identification code (ID), and a RFID reader and an electronic lock are provided in a fiber distribution box. Also, the fiber distribution management system further comprises backstage management software and a mobile termination. When it needs to change the connection of any of the fibers, the backstage management software sends a command to the mobile termination carried by the operator, and the operator can find a respective port for the fiber optic connector by means of the mobile termination. As a result, the operator can finish the fiber connection under the guidance of the RFID reader and LED lamps, and any misconnection of the optical fibers can be found in the field in time. With such RFID technology, various optical cables and fibers distributed in the field or the distribution box can be found in time as required, and it can ensure that all operations of the operator on the fibers are correct.

Figure 1:
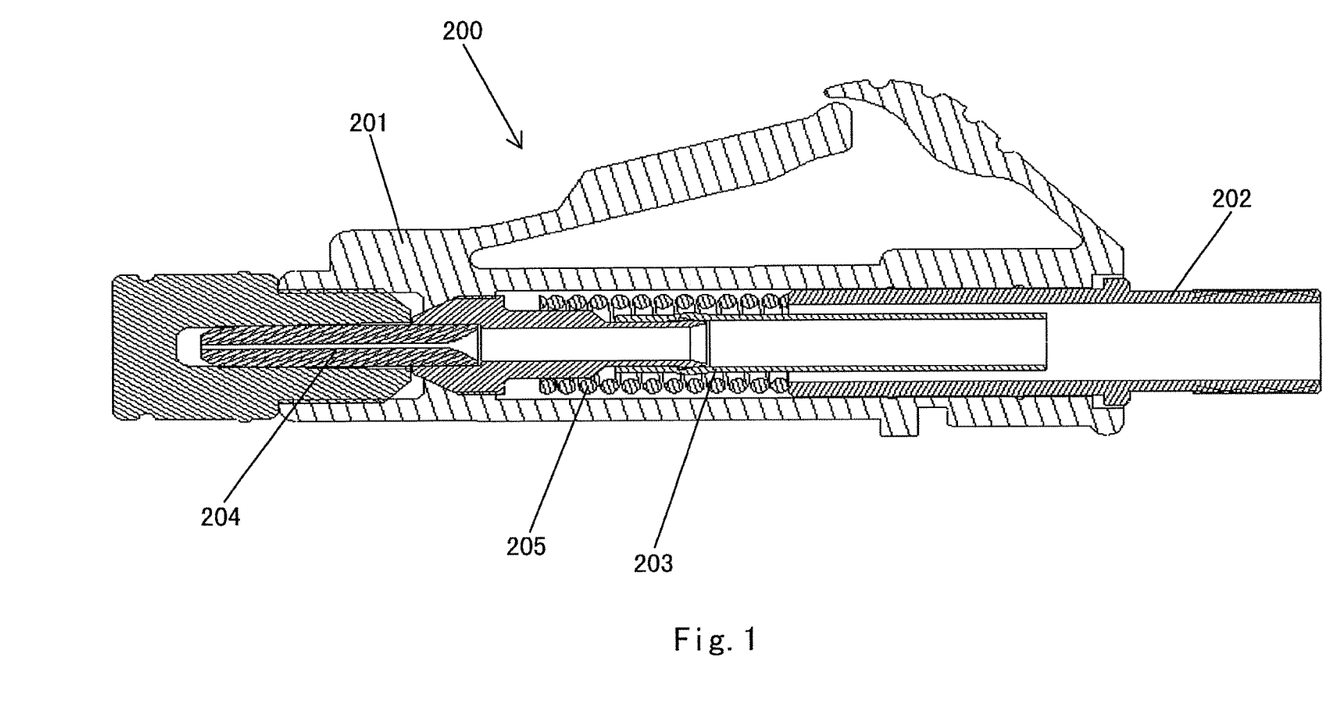
FIG. 1 is an illustrative longitudinal section view of a fiber optic connector in the prior art.

FIG. 1 is a cross section view of a LC fiber optic connector in the prior art. As shown in FIG. 1, the fiber optic connector 200 comprises a housing 201 made of plastic material, a tail sleeve 202 mounted in the housing 201 and configured to connect an optical cable (not shown), a holding tube 203 mounted in the housing 201 and configured to hold a fiber of the optical cable therein, a fiber ferrule 204 connected to the housing 201 and extending outside the housing 201, and a spring 25 disposed between the fiber ferrule 204 and the tail sleeve 202. The holding tube 203 also is used to guide a gel filled during assembling the fiber optic connector. Generally, when the RFID tag is mounted on the housing, the readability of the RFID tag is greatly decreased due to the spring 205 and the tail sleeve 202, because the spring 205 and the tail sleeve 202 are made of metal and extend almost over total longitudinal length of the fiber optic connector 200.

In order to avoid the disadvantageous effect of the metal spring 205 and the metal tail sleeve 202 on readability of the RFID tag, there are two kinds of solutions in the prior art. In the first solution, a layer of electromagnetic shield material is added between the tail sleeve 202 and/or the spring 205 and the RFID tag to electromagnetically isolate the RFID tag from the tail sleeve 202 and/or the spring 205. In the second solution, a suitable gap is provided between the tail sleeve 202 and/or the spring 205 and the RFID tag. According to experiment, the disadvantageous effect of the tail sleeve 202 and/or the spring 205 on the RFID tag becomes less as the gap becomes larger. In this solution, in order to obtain a good readability, the gap between the tail sleeve 202 and/or the spring 205 and the RFID tag must be set to be large enough. However, the above solutions both increase the profile size of the fiber optic connector. As a result, the LC type of fiber optic connectors fabricated based on the above solutions lack the advantage of small size of single-fiber optic connectors and cannot be arranged in a high density.

SUMMARY OF THE INVENTION

The present invention has been made to overcome or alleviate at least one aspect of the above mentioned disadvantages.

Accordingly, it is an object of the present invention to provide a fiber optic connector having a RFID tag. The fiber optic connector has a small size and can effectively avoid disadvantageous effect of metal members of the fiber optic connector on the readability of the RFID tag.

According to an aspect of the present invention, there is provided a fiber optic connector having a radio frequency identification tag for optically coupling with a mated fiber optic connector, comprising: a housing; a fiber ferrule extending from a first end of the housing; a spring member provided within the housing; a tail sleeve connected at a second end of the housing opposite to the first end to fix an end of an optical cable; and a tag receiving portion formed in a sidewall of the housing, wherein the radio frequency identification tag is received in the tag receiving portion, and wherein the tag receiving portion is separated from the spring member and the tail sleeve in a longitudinal direction of the housing.

According to an exemplary embodiment of the present invention, an auxiliary tube extending from the second end of the housing and integrally formed with the housing, and the tail sleeve is fitted on the auxiliary tube.

According to another exemplary embodiment of the present invention, the tail sleeve is partly inserted into the housing from the second end of the housing.

According to another exemplary embodiment of the present invention, a minimal distance between the tag receiving portion and the spring member in the longitudinal direction of the housing is set to be 2.5 mm; and a minimal distance between the tag receiving portion and the tail sleeve in the longitudinal direction of the housing is set to be 1.5 mm.

According to another exemplary embodiment of the present invention, a distance between the tag receiving portion and the spring member in the longitudinal direction of the housing is set to be in a range of 2.5-5 mm; and a distance between the tag receiving portion and the tail sleeve in the longitudinal direction of the housing is set to be in a range of 1.5-5 mm.

According to another exemplary embodiment of the present invention, the tag receiving portion is configured to be a substantial cubic chamber extending within the sidewall of the housing, and the tag receiving portion has at least one opening communicated with outside of the fiber optic connector so as to place the radio frequency identification tag into the tag receiving portion through the opening.

According to another exemplary embodiment of the present invention, a tongue portion is formed on a sidewall of the tag receiving portion adjacent to an outside of the fiber optic connector at one of the at least one opening, and a block protrusion is formed on the tongue portion.

According to another exemplary embodiment of the present invention, a dust cover is detachably mounted on the opening to seal the opening.

According to another exemplary embodiment of the present invention, a sealing material is filled in the tag receiving portion to protect the radio frequency identification tag.

According to another exemplary embodiment of the present invention, the fiber optic connector further comprises a protection sleeve in which a fiber of the optical cable is received and around which the spring member is disposed.

According to another exemplary embodiment of the present invention, the fiber optic connector further comprises a fixation tube having a first end connected to the fiber ferrule and a second end connected to the protection sleeve.

According to another exemplary embodiment of the present invention, the fiber optic connector further comprises a stress relief boot fitted on the tail sleeve, wherein the optical cable passes through the stress relief boot and is fixed to the tail sleeve.

According to another exemplary embodiment of the present invention, the housing comprises a first housing for connecting the optical cable and a second housing for mounting the fiber ferrule, the first housing and the second housing are detachably assembled together in a snap manner, and the tag receiving portion is formed in the second housing.

In the fiber optic connector having the RFID tag according to above various embodiments of the present invention, the RFID tag is disposed between the auxiliary tube for fixing the optical cable and the spring in the longitudinal direction of the housing. Thereby, the RFID tag does not overlap with the metal members, such as the metal auxiliary tube and the metal spring, of the fiber optic connector in a lateral direction of the housing, and the RFID tag overlaps with only the non-metal housing and the non-metal protection sleeve in the lateral direction of the housing. As a result, it can eliminate the effect of metal materials in the fiber optic connector on the reading performance of the radio frequency identification tag. Furthermore, since the RFID tag is placed in the tag receiving portion within the sidewall of the housing, it does not increase the profile size of the fiber optic connector, facilitating the arrangement of the fiber optic connectors in high density.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
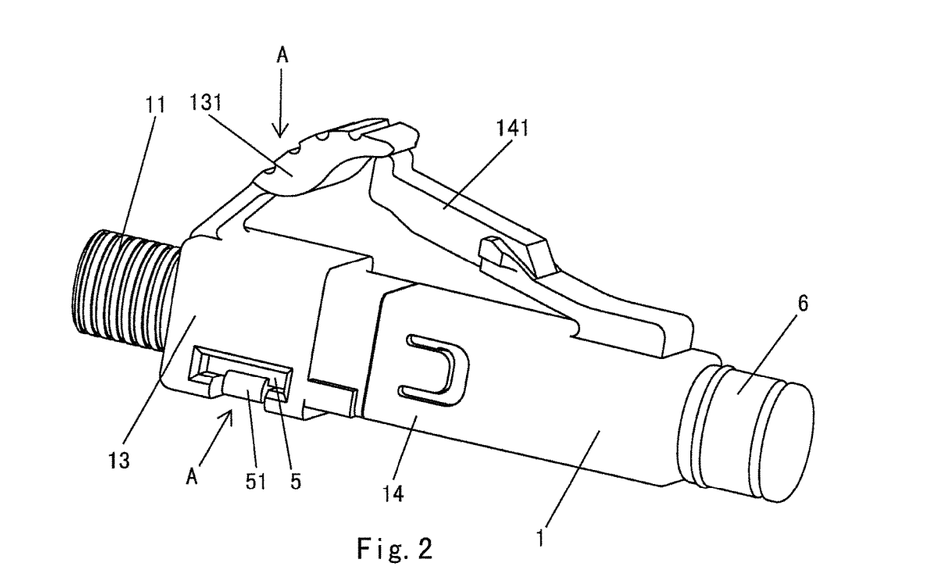
FIG. 2 is an illustrative perspective view of a fiber optic connector according to an exemplary embodiment of the present invention.
Figure 3:
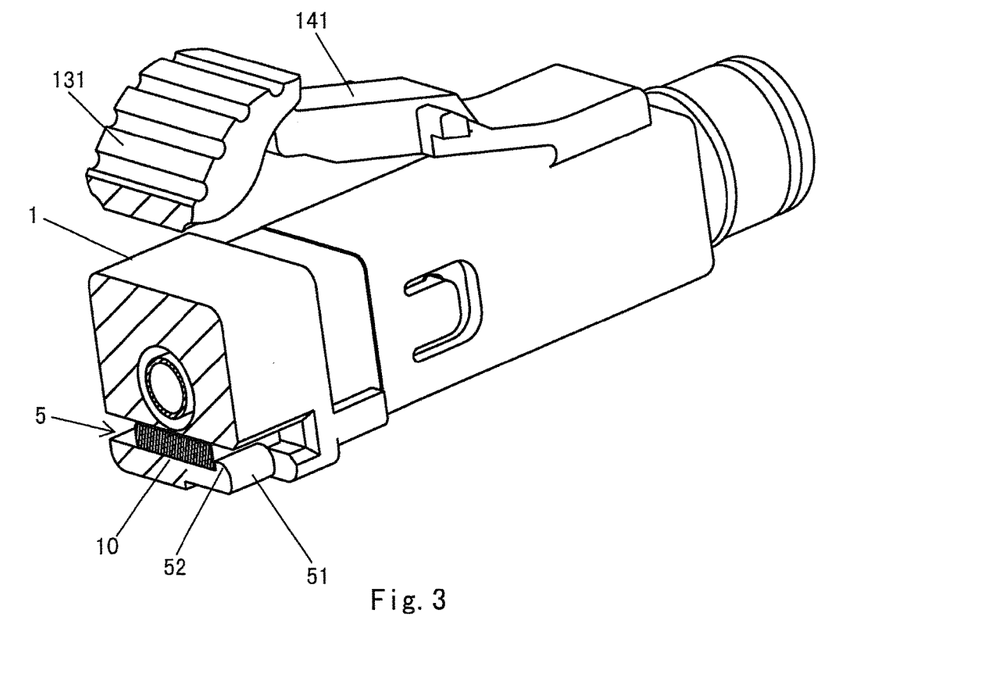
FIG. 3 is an illustrative cross section view of the fiber optic connector taken along line A-A shown in FIG. 2.
Figure 4:
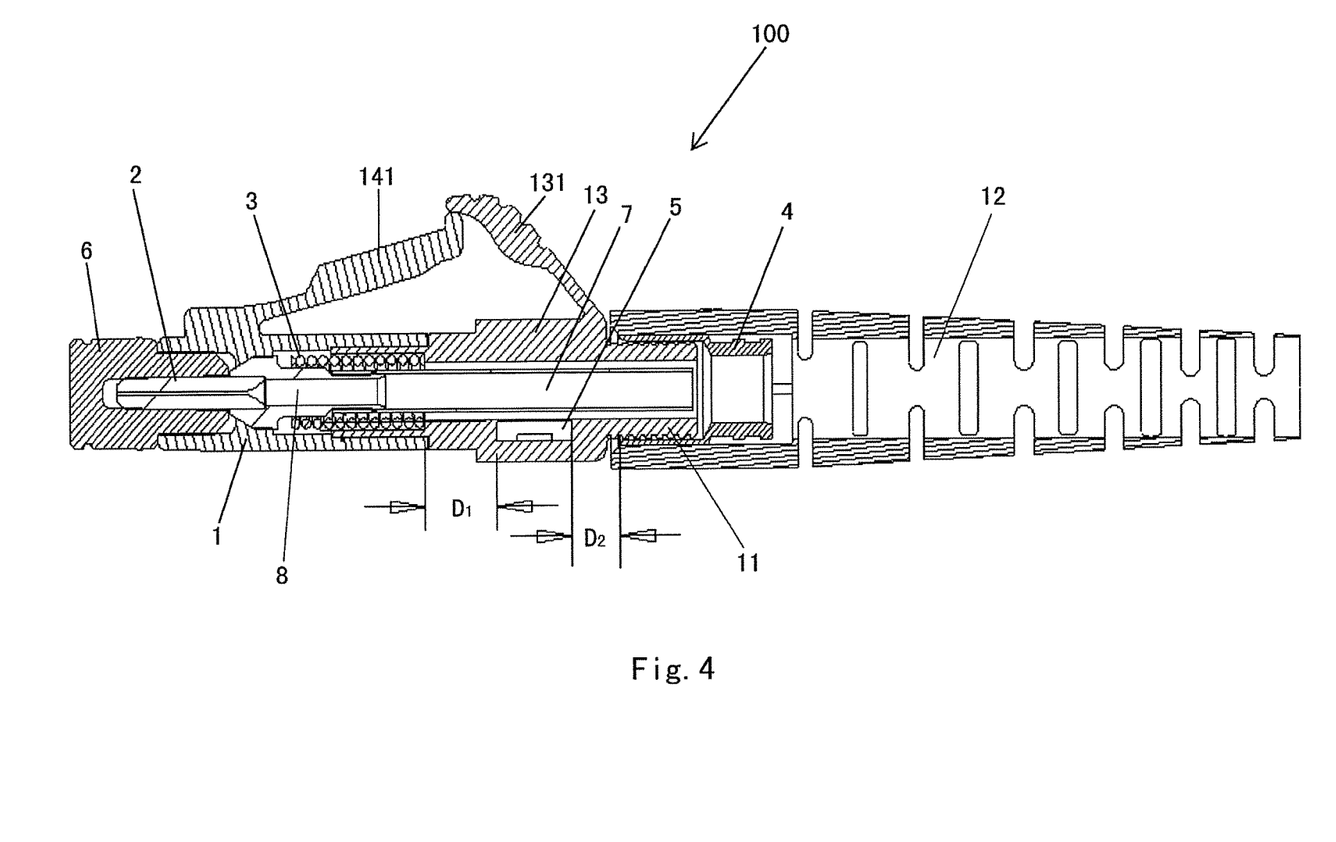
FIG. 4 is an illustrative longitudinal section view of the fiber optic connector shown in FIG. 2.

FIGS. 2-4 show a fiber optic connector 100 according to an exemplary embodiment of the present invention, for example, LC fiber optic connector. The fiber optic connector 100 for connecting a fiber of an optical cable (not shown) has a RFID tag 10. The fiber optic connector 100 is configured to be detachably inserted into an adapter (not shown) to optically couple with a mated fiber optic connector (not shown) inserted into the adapter, so that the fiber of the optical cable connected to the fiber optic connector 100 is optically coupled with a fiber of the mated fiber optic connector. In order to quickly and correctly couple the fiber optic connector 100 and the mated fiber optic connector, the fiber optic connector 100 comprises the RFID tag. Also, the fiber optic connector 100 further comprises a housing 1 made of an insulation material, for example, plastic, a fiber ferrule 2 extending from a first end of the housing 1, a spring member 3 provided within the housing 1, a tail sleeve 4 connected at a second end of the housing 1 opposite to the first end to fix an end of an optical cable, and a tag receiving portion 5. The tag receiving portion 5 is formed in a sidewall of the housing 1, for example, formed in a sidewall near the bottom of the housing 1. The radio frequency identification tag 10 is received in the tag receiving portion 5, and the tag receiving portion 5 is separated from the spring member 3 and the tail sleeve 4 in a longitudinal direction of the housing 1 by a distance, respectively.

In an exemplary embodiment, the housing 1 comprises a first housing 13 for connecting the optical cable and a second housing 14 for mounting the fiber ferrule 2. The first housing 13 and the second housing 14 may be detachably assembled together in a snap manner, and the tag receiving portion 5 may be formed in the first housing 13. A locking mechanism 141 for locking the fiber optic connector in the adapter (not shown) is provided on the second housing 14, and a release mechanism 131 for unlocking the locking mechanism 141 is provided on the first housing 13. The locking mechanism 141 moves toward the housing 1 in a radial direction of the fiber optic connector by pressing the release mechanism 131.

In an exemplary embodiment of the fiber optic connector of the present invention, as shown in FIG. 2, an auxiliary tube 11 extends from the second end of the housing 1 and is integrally formed with the housing 1. As shown in FIG. 4, the tail sleeve 4 is fitted and engaged on the auxiliary tube 11 for example, in a crimp connection manner. In an alternative embodiment, the tail sleeve 4 may be partly inserted into the housing 1 from the second end of the housing 1.

In another exemplary embodiment of the present invention, a distance D1 between a left end of the tag receiving portion 5 and the spring member 3 in the longitudinal direction of the housing 1 is set to be in a range of 2.5-5 mm, and a distance D2 between a right end of the tag receiving portion 5 and the tail sleeve 4 in the longitudinal direction of the housing 1 is set to be in a range of 1.5-5 mm. In a case where the fiber optic connector has a regular length as a standard fiber optic connector, if the distances D1 and D2 are set to be too small, then the spring member 3 and the tail sleeve 4 made of metal (for example, copper or stainless steel) produce a electromagnetic effect on the RFID tag 10, decreasing the readability of the RFID tag 10 by a reader (not shown), and also reduce the housing strength of the fiber optic connector. On the other hand, if the distances D1 and D2 are set to be too large, then the profile size of the fiber optic connector 100 is increased, it reduces the number of the fiber optic connectors arranged in a certain space. In an exemplary embodiment, the distance D1 may be set to be in a range of 3.0-3.5 mm, and the distance D2 may be set to be in a range of 1.5-2.0 mm. In an embodiment, the smallest distance between the tag receiving portion 5 and the spring member 3 in the longitudinal direction of the housing 1 is set to be 2.5 mm, and the smallest distance between the tag receiving portion 5 and the tail sleeve 4 in the longitudinal direction of the housing 1 is set to be 1.5 mm.

In an exemplary embodiment of the present invention, the tag receiving portion 5 may be configured to be a substantial cubic chamber extending within the sidewall of the housing 1. The tag receiving portion 5 has at least one opening communicated with outside of the fiber optic connector so as to place the RFID tag 10 into the tag receiving portion 5 through the opening.

In an exemplary embodiment, the tag receiving portion 5 is formed with two openings at both sides of the fiber optic connector in a lateral direction of the fiber optic connector.

In another exemplary embodiment, the tag receiving portion 5 is formed with only one opening at one side of the fiber optic connector in the lateral direction and is closed at the other side of the fiber optic connector in the lateral direction. With this configuration, the RFID tag 10 can be easily and reliably held in the tag receiving portion 5.

Also, as shown in FIGS. 2-3, a tongue portion 51 is formed on a sidewall of the tag receiving portion 5 adjacent to an outside of the fiber optic connector 100 at one of the at least one opening, and a block protrusion 52 is formed on the tongue portion 51. The block protrusion 52 is configured to have an arc or angled surface. During inserting the RFID tag 10 into the tag receiving portion 5, the RFID tag 10 may bias the tongue portion 51 outside by pressing the arc or angled surface of the block protrusion 52. Also, when it needs to take the RFID tag 10 out of the tag receiving portion 5, an operator may press the tongue portion 51 downward to bias the tongue portion 51 outside by hand or tool, such as screw driver, until the block protrusion 52 does not block the RFID tag 10 anymore and the RFID tag 10 can be smoothly taken out of the tag receiving portion 5. In this way, by operating the tongue portion 51, the RFID tag 10 can be easily placed in or taken out of the tag receiving portion 5, facilitating the replacement and maintenance of the RFID tag 10.

Also, a sealing material may be coated on and/or filled in the opening, or a dust cover may be detachably mounted on the opening to seal the opening. In this way, the RFID tag 10 can be sealed in the tag receiving portion, protecting the RFID tag from being disadvantageously affected by external environment.

In an exemplary embodiment of the fiber optic connector 100 having the RFID tag of the present invention, as shown in FIG. 3, a dust cap 6 is mounted on the first end of the housing 1 to seal the housing and protect the fiber ferrule 2. The fiber optic connector 100 may further comprise a protection sleeve 7. The fiber of the optical cable passes through the protection sleeve 7 and is held in the protection sleeve 7. The spring member 3, such as spring, is disposed around the protection sleeve 7. The fiber optic connector 100 may further comprise a fixation tube 8 having a first end connected to the fiber ferrule 2 and a second end connected to the protection sleeve 7. The fiber ferrule 2 is fixed on the first end (left end in FIG. 4) of the fixation tube 8, and the fiber passes through the protection sleeve 7 and the fixation tube 8 and is connected to the fiber ferrule 2. Both ends of the spring member 3 abut against the fixation tube 8 and a ring step formed within the inside of the first housing 13, respectively. When the fiber optic connector 100 is inserted into the adapter and coupled with the mated fiber optic connector inserted into the adapter, the fiber ferrule 2 is pushed by the mated fiber optic connector, and in turn compresses the spring member 3 via the fixation tube 8, so that the fiber ferrules of the fiber optic connector 100 and the mated fiber optic connector tightly abut against each other.

In an exemplary embodiment of the present invention, the fiber optic connector may further comprise a stress relief boot 12 fitted on the tail sleeve 4. The optical cable passes through the stress relief boot 12 and is fixed to the tail sleeve 4. After the optical cable passes through the stress relief boot 12 and the tail sleeve 4, the outmost protection shield of the optical cable (a single-fiber cable) is peeled off to expose an inside tube and a Kevlar layer, and the inside tube is peeled off to expose the fiber. The fiber passes through the protection sleeve 7 and the fixation tube 8 and enters into the fiber ferrule. The Kevlar layer is uniformly arranged on the auxiliary tube 11, and the metal tail sleeve 4 is crimped on the auxiliary tube 11 and the protection shield layer of the optical cable to connect the optical cable/fiber to the fiber optic connector 100.

In an exemplary embodiment of the fiber optic connector 100 of the present invention, as shown in FIG. 4, the housing 1, the fiber ferrule 2, the fixation tube 8, the protection sleeve 7, the auxiliary tube 11 and the tail sleeve 4 may have a common center axis.

In the fiber optic connector having the RFID tag according to above various embodiments of the present invention, the RFID tag 10 is disposed between the auxiliary tube 11 for fixing the optical cable and the spring 3 in the longitudinal direction of the housing 1. Thereby, the RFID tag 10 does not overlap with the metal members, such as the metal auxiliary tube 11 and the metal spring 3, of the fiber optic connector in a lateral direction of the housing perpendicular to the longitudinal direction, and the RFID tag 10 overlaps with only the non-metal first housing 13 and the non-metal protection sleeve 7 in the lateral direction of the housing. As a result, it can eliminate the effect of metal materials in the fiber optic connector on the reading performance of the RFID tag. Furthermore, since the RFID tag is placed in the tag receiving portion within the sidewall of the housing, it does not increase the profile size of the fiber optic connector, facilitating the arrangement of the fiber optic connectors in high density.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fiber optic connector having a radio frequency identification tag for optically coupling with a mated fiber optic connector, comprising:
   a housing;
   a fiber ferrule extending from a first end of the housing;
   a spring member provided within the housing;
   a tail sleeve connected at a second end of the housing opposite to the first end to fix an end of an optical cable; and
   a tag receiving portion formed in a sidewall of the housing,
   wherein the radio frequency identification tag is received in the tag receiving portion, and
   wherein the tag receiving portion is arranged between the spring member and the tail sleeve and separated from the spring member and the tail sleeve in a longitudinal direction of the housing.

2. The fiber optic connector according to claim 1, wherein an auxiliary tube extending from the second end of the housing and integrally formed with the housing, and wherein the tail sleeve is fitted on the auxiliary tube.

3. The fiber optic connector according to claim 1, wherein the tail sleeve is partly inserted into the housing from the second end of the housing.

4. The fiber optic connector according to claim 1, wherein a minimal distance between the tag receiving portion and the spring member in the longitudinal direction of the housing is set to be 2.5 mm; and wherein a minimal distance between the tag receiving portion and the tail sleeve in the longitudinal direction of the housing is set to be 1.5 mm.

5. The fiber optic connector according to claim 1, wherein the tag receiving portion is configured to be a substantial cubic chamber extending within the sidewall of the housing, and wherein the tag receiving portion has at least one opening communicated with outside of the fiber optic connector so as to place the radio frequency identification tag into the tag receiving portion through the opening.

6. The fiber optic connector according to claim 5, wherein a tongue portion is formed on a sidewall of the tag receiving portion adjacent to an outside of the fiber optic connector at one of the at least one opening, and wherein a block protrusion is formed on the tongue portion.

7. The fiber optic connector according to claim 5, wherein a dust cover is detachably mounted on the opening to seal the opening.

8. The fiber optic connector according to claim 1, wherein a sealing material is filled in the tag receiving portion to protect the radio frequency identification tag.

9. The fiber optic connector according to claim 1, further comprising:
   a protection sleeve n which a fiber of the optical cable is received and around which the spring member is disposed.

10. The fiber optic connector according to claim 9, further comprising:
    a fixation tube having a first end connected to the fiber ferrule and a second end connected to the protection sleeve.

11. The fiber optic connector according to claim 1, further comprising:
    a stress relief boot fitted on the tail sleeve, wherein the optical cable passes through the stress relief boot and is fixed to the tail sleeve.

12. The fiber optic connector according to claim 1,
    wherein the housing comprises a first housing for connecting the optical cable and a second housing for mounting the fiber ferrule,
    wherein the first housing and the second housing are detachably assembled together in a snap manner, and
    wherein the tag receiving portion is formed in the second housing.

13. The fiber optic connector according to claim 1,
wherein a distance between the tag receiving portion and the spring member in the longitudinal direction of the housing is set to be in a range of 2.5-5 mm; and
wherein a distance between the tag receiving portion and the tail sleeve (4) in the longitudinal direction of the housing is set to be in a range of 1.5-5 mm.

14. The fiber optic connector according to claim 1, wherein the spring member and the tail sleeve are made of at least one metal material.

15. The fiber optic connector according to claim 1, wherein the tag receiving portion is arranged such that the radio frequency identification tag received in the tag receiving portion does not radially overlap with the spring member and the tail sleeve.

16. The fiber optic connector according to claim 1, wherein the tag receiving portion is configured to receive the radio frequency identification tag within the housing.

* * * * *

UNITED STATES PATENT AND TRADEMARK OFFICE
CERTIFICATE OF CORRECTION

PATENT NO. : 9,971,104 B2  
APPLICATION NO. : 14/910561  
DATED : May 15, 2018  
INVENTOR(S) : Tong et al.

Page 1 of 1

It is certified that error appears in the above-identified patent and that said Letters Patent is hereby corrected as shown below:

In the Claims

Column 8, Line 47, Claim 9: "protection sleeve n which a fiber" should read --protection sleeve in which a fiber--

Column 9, Line 6, Claim 13: "tail sleeve (4) in the longitudinal" should read --tail sleeve in the longitudinal--

Signed and Sealed this  
Twenty-first Day of April, 2020

Andrei Iancu  
*Director of the United States Patent and Trademark Office*